(12) United States Patent
Fiszman et al.

(10) Patent No.: US 11,080,309 B2
(45) Date of Patent: Aug. 3, 2021

(54) VALIDATING CLUSTER RESULTS

(71) Applicant: PayPal, Inc., San Jose, CA (US)

(72) Inventors: Shir Fiszman, Givatayim (IL); Aviv Ben-Arie, Ramat Gan (IL)

(73) Assignee: PayPal, Inc., San Jose, CA (US)

( * ) Notice: Subject to any disclaimer, the term of this patent is extended or adjusted under 35 U.S.C. 154(b) by 34 days.

(21) Appl. No.: 16/375,849

(22) Filed: Apr. 4, 2019

(65) Prior Publication Data

US 2020/0320103 A1 Oct. 8, 2020

(51) Int. Cl.
*G06F 17/00* (2019.01)
*G06F 16/28* (2019.01)

(52) U.S. Cl.
CPC .................. *G06F 16/287* (2019.01)

(58) Field of Classification Search
CPC ...................................................... G06F 16/287
See application file for complete search history.

(56) References Cited

U.S. PATENT DOCUMENTS

| | | | |
|---|---|---|---|
| 2006/0095521 A1 | 5/2006 | Patinkin | |
| 2012/0311496 A1* | 12/2012 | Cao | G06F 16/287 715/821 |
| 2015/0046457 A1* | 2/2015 | Weinstein | G06F 16/287 707/737 |
| 2015/0142580 A1* | 5/2015 | Aydin | G06Q 30/0269 705/14.66 |
| 2016/0004765 A1* | 1/2016 | Tyercha | G06F 16/2228 707/737 |
| 2017/0316084 A1* | 11/2017 | Pogrebtsov | G06N 5/022 |
| 2019/0278443 A1* | 9/2019 | Mashayekhi | G06Q 40/06 |
| 2019/0303118 A1* | 10/2019 | Avinash Dorle | G06F 16/287 |
| 2019/0303451 A1* | 10/2019 | Takahashi | G06F 16/20 |

* cited by examiner

*Primary Examiner* — Anil N Kumar (57) ABSTRACT

Techniques are disclosed relating to validating cluster results. A computer system may receive a first cluster result generated at a first computer platform configured to execute a first software implementation of a clustering algorithm to generate the first cluster result. The first cluster result may include a first set of clusters, each of which groups one or more of a plurality of data values. The computer system may receive a second cluster result generated at a second computer platform configured to execute a second, different software implementation of the same clustering algorithm to generate the second cluster result. The second cluster result may include a second set of clusters. The computer system may cause cluster information to be presented to a user that indicates that a cluster of the first set of clusters groups data values that are grouped by two or more of the second set of clusters.

19 Claims, 7 Drawing Sheets

VALIDATING CLUSTER RESULTS

BACKGROUND

Technical Field

This disclosure relates generally to a platform for validating cluster results.

Description of the Related Art

Generally speaking, companies collect various types of data about their users, such data often being used to improve the services provided by those companies. In order to make sense of the data, many companies group data points into different groups (or clusters) such that the data points in one group are more similar to each other than to those in another group. In some cases, machine learning methods such as k-means clustering are used to create clusters that are based on collected data. Once clusters have been created, inferences can often be drawn regarding subsequently collected data based on the cluster in which that data falls.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a cluster result that includes multiple clusters, the terms "first" cluster and "second" cluster can be used to refer to any cluster of the cluster result. In other words, the first and second clusters are not limited to the initial two clusters of a cluster result.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

During the development and deployment of a clustering model (which identifies a set of clusters), the model may initially be developed on a research platform before being recreated on a production platform. In many cases, implementation differences between the research platform and the production platform result in differences in the model on each platform. For example, the clustering algorithm used to create the model may be implemented using Python with SKLearn on the research platform and Hadoop with Scala Spark on the production platform. Since the clustering model can vary between platforms, it may be desirable to verify the correctness of the model on the production platform to ensure that the model is compliant with the research intentions as expressed by the model on the research platform.

The present disclosure describes various techniques for identifying differences between cluster results, which may be models in the machine learning context. In various embodiments described below, a computer system receives cluster results from two cluster platforms, where each cluster result may include a set of clusters that individually group data values processed by those cluster platforms. In various cases, the two cluster platforms may be implemented in such sufficiently different manners that the cluster results generated by those cluster platforms may be different. For example, the two cluster platforms may execute different software implementations of the same clustering algorithm to produce their respective cluster result. As another example, the two cluster platforms may operate on the same set of data values, but the data values may be in different formats such as integers on one platform while double-precision floating-point numbers on the other platform. As yet another example, the clustering algorithm may include a random component such as a random selection that can cause the cluster results to be different between iterations. The random component may be affected by how a random number generator is implemented on the respective cluster platform. Accordingly, the cluster results received by the computer system from the two cluster platforms may have differences.

After receiving the cluster results, in some embodiments, the computer system produces a cluster mapping in which a data value common between the two cluster results is mapped to a cluster in each of those two results. The computer system may then generate, based on the mapping, cluster information that indicates differences between the two cluster results. In some embodiments, the computer system generates cluster information that includes a matrix comprising rows and columns where each row corresponds to a respective cluster in one of the cluster results and each column corresponds to a respective cluster in the other cluster result. The intersection of a row and a column may correspond to a value that indicates the number of data values that are common between the two corresponding clusters. Based on the cluster information, the computer system (or a user) may determine any differences between the two cluster results. For example, the computer system may determine that a particular cluster in one of the cluster results groups data values that are grouped by two or more clusters in the other cluster group.

These techniques are advantageous as they allow for differences between cluster results to be identified, which may allow for users to ensure that cluster results generated on separate platforms are sufficiently similar. This result may be particularly important in a software development environment. Consider the development and deployment of a cluster result that involves two teams: a research team and a production team. The research team may use their own platform to develop a cluster result that is compliant with the research goals set out by the research team. After the cluster result has been developed, the production team may attempt to recreate the research team's cluster result on a production platform. For various reasons such as the use of a non-deterministic clustering algorithm, differences between the implementations of the research platform and the production platform, etc., the cluster result created on the production platform may be different than the cluster result developed by the research team. Accordingly, the techniques discussed in the present disclosure allow for those teams to identify a level of similarity between the cluster result on the research platform and the cluster result on the production platform so that the teams may discern whether the research goals are being carried out on the production platform. For example, the matrix (mentioned above and explained in detail with respect to FIG. 4) may allow a user to easily determine if a cluster on the production platform is split into many clusters on the research platform or vice versa. Furthermore, the relationships between two clusters on different platforms can be readily determined—e.g., which cluster on one platform corresponds to which cluster on the other platform. An example system for implementing these techniques will now be discussed below, starting with FIG. 1.

Figure 1:
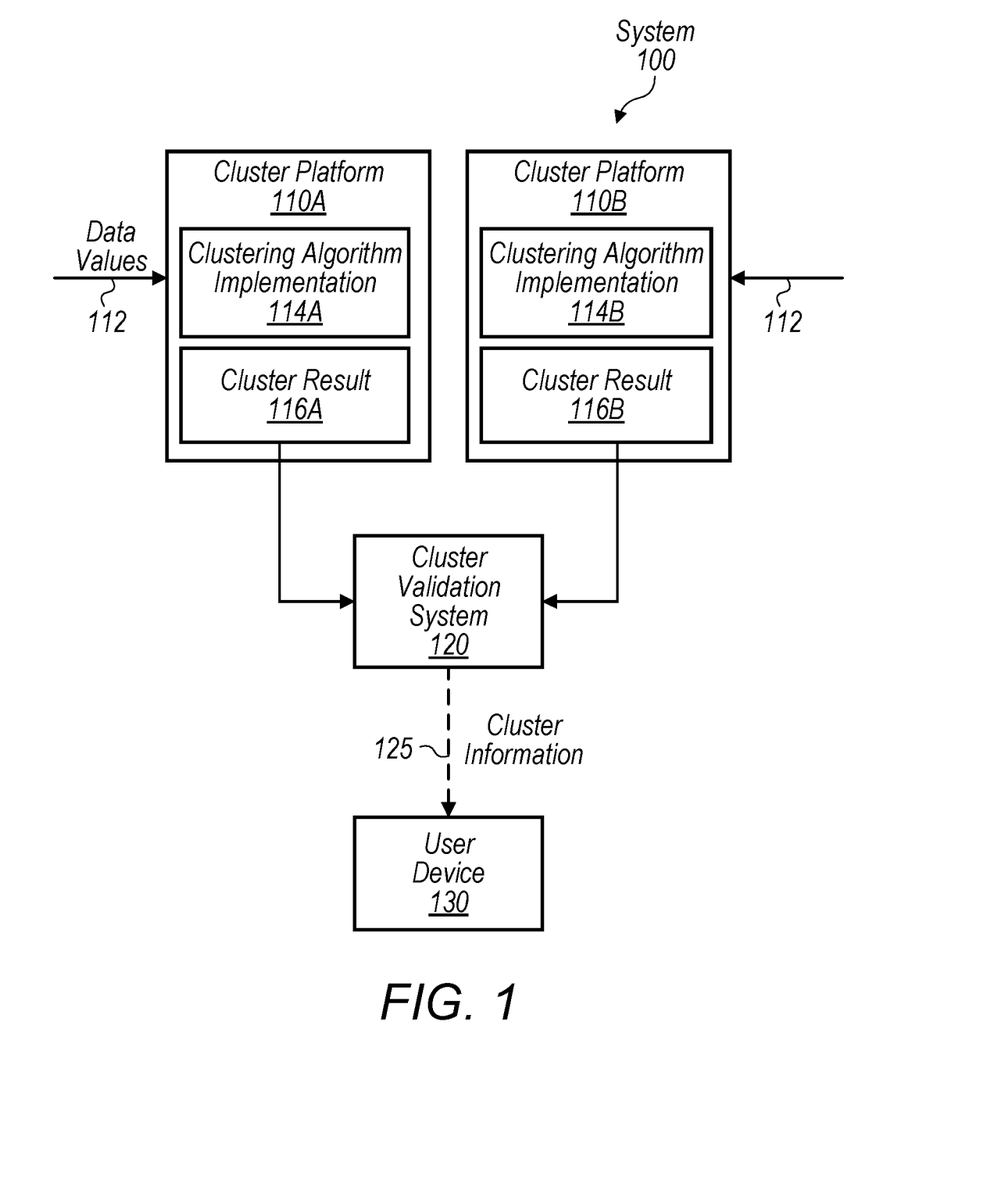
FIG. 1 is a block diagram illustrating example elements of a system that facilitates the validation of cluster results, according to some embodiments.

Turning now to FIG. 1, a block diagram of a system 100 is shown. System 100 is a set of components that are implemented via hardware or a combination of hardware and software routines. In the illustrated embodiment, system 100 includes cluster platforms 110A and 110B, a cluster validation system 120, and a user device 130. As further illustrated, cluster platform 110A includes a clustering algorithm implementation 114A and a cluster result 116A while cluster platform 110B includes a clustering algorithm implementation 114B and a cluster result 116B. In some embodiments, system 100 may be implemented differently than illustrated. For example, instead of sending cluster information 125 to a user device 130, cluster validation system 120 may include a display for presenting cluster information 125 to a user.

A cluster platform 110, in various embodiments, implements an environment in which a clustering algorithm is executed to generate cluster results 116. A cluster platform 110 may include underlying hardware and a set of software routines that run on that hardware to execute the clustering algorithm. In some cases, cluster platforms 110A and 110B may correspond to separate computer systems with the same or different software routines. In other cases, cluster platforms 110A and 110B may be implemented on the same computer system, where each one includes a respective set of software routines.

In various embodiments, cluster platforms 110 execute the same clustering algorithm to generate results 116. For example, cluster platforms 110 may execute a clustering algorithm such as K-means clustering, agglomerative hierarchical clustering, etc. Cluster platform 110A, however, may be implemented differently than cluster platform 110B. For example, cluster platforms 110A and 110B each include a clustering algorithm implementation 114 that may be different from the other. The differences between clustering algorithm implementations 114 may include the use of different programming languages to implement the clustering algorithm. For example, clustering algorithm implementation 114A may use Python with SKLearn to implement the clustering algorithm while implementation 114B may use Hadoop with Scala Spark.

Figure 2:
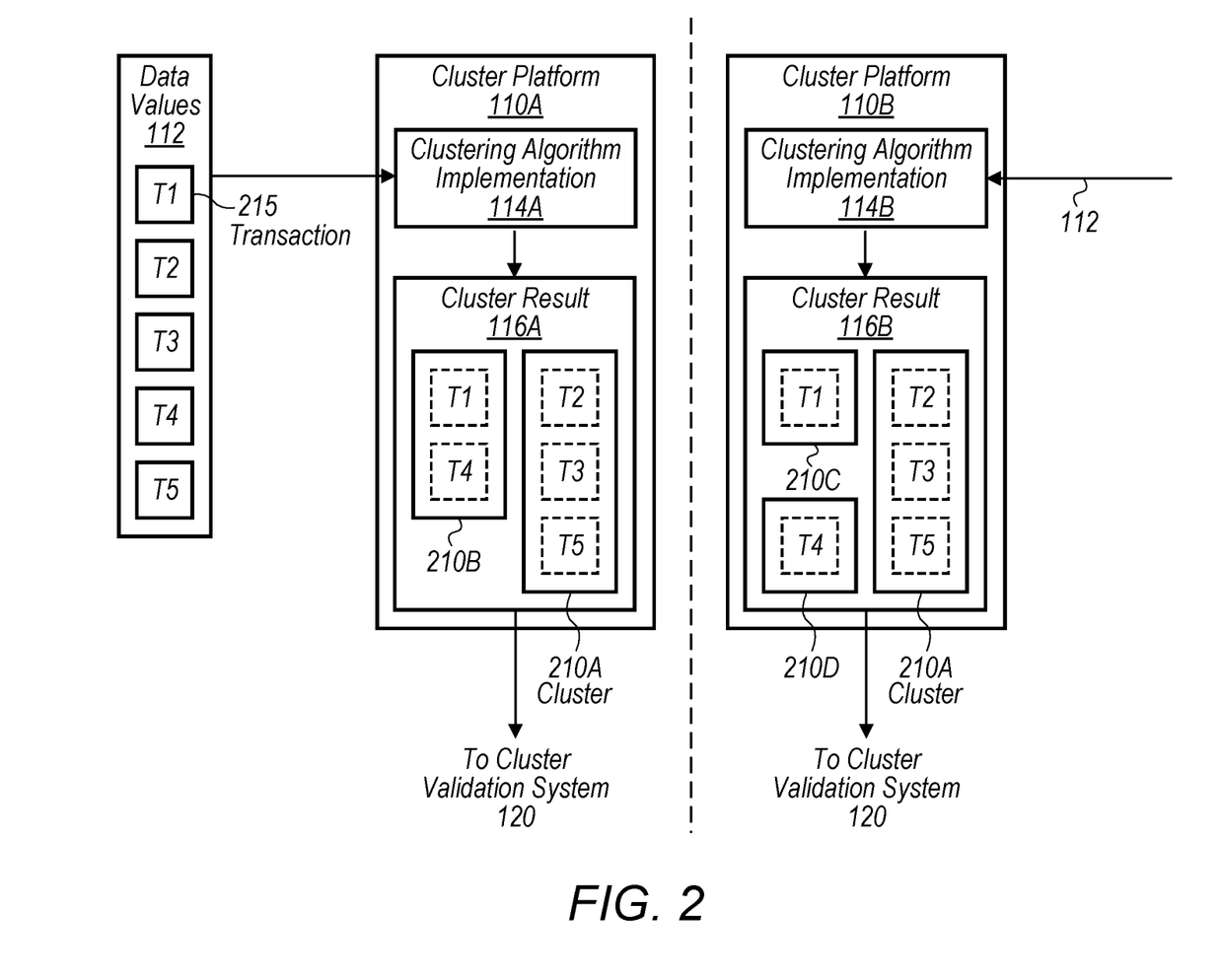
FIG. 2 is a block diagram illustrating example elements of cluster platforms that produce cluster results, according to some embodiments.

The differences between clustering algorithm implementations 114 may affect the cluster results 116 generated by cluster platforms 110 such that cluster platforms 110A and 110B may generate different cluster results 116 despite implementing the same clustering algorithm. A cluster result 116, in various embodiments, groups data values 112 into a set of clusters. For example, a cluster result 116 may group a set of transactions into three clusters corresponding to non-risky transactions, moderately risky transactions, and risky transactions. However, differences between clustering algorithm implementations 114A and 114B may result in cluster results 116A and 116B that group data values 112 differently than each other. As illustrated in FIG. 2 for example, cluster result 116A includes 2 clusters (clusters 210A and 210B) whereas cluster result 116B includes 3 clusters (clusters 210A, 210C, and 210D). Thus, two cluster results 116 may have different amounts of clusters.

When generating and then deploying cluster results 116, in various embodiments, data values 112 are provided to cluster platforms 110. Cluster platforms 110 feed the received data values 112 into their clustering algorithm implementations 114 to generate their respective cluster results 116. Those cluster results 116 may then be provided to cluster validation system 120 for analysis to determine if there are differences between the cluster results 116. Cluster platforms 110 are discussed in greater detail with respect to FIG. 2.

Cluster validation system 120, in various embodiments, facilitates the determination of differences between cluster results 116. For example, cluster validation system 120 may enable a user to learn that one of the cluster results 116 groups a set of data values 112 into one cluster while the other cluster result 116 groups the data values 112 into two or more clusters. Cluster validation system 120 may also facilitate the determination of similarities or correspondences between cluster results 116. Consider an example in which the clusters in a given cluster result 116 are assigned an identifier by the clustering algorithm. Since the clustering algorithm may arbitrarily assign identifiers, the identifiers used in two cluster results 116 might be different. Accordingly, two corresponding clusters may be assigned different identifiers and thus it may be difficult to determine that they correspond. Cluster validation system 120, however, may indicate that those two clusters correspond.

In order to identify differences and similarities between cluster results 116A and 116B, in various embodiments, cluster validation system 120 generates cluster information 125 based on cluster results 116. Cluster information 125 may include a cluster mapping that maps data values 112 to respective clusters in cluster results 116. For example, a data value 112 common between cluster results 116A and 116B may be mapped to a particular cluster in cluster result 116A and a particular cluster in cluster result 116B. In some embodiments, a matrix is created, based on the cluster mapping, to visually show how data values 112 are grouped in relation to cluster results 116. As an example, the matrix may show that one cluster in cluster result 116A groups data values 112 that are grouped by two or more clusters in cluster result 116B (or vice versa). In various cases, the matrix may be included in cluster information 125. An example of a matrix is discussed in greater detail with respect to FIG. 4.

In various embodiments, cluster information 125 is provided to a user device 130 that is capable of presenting cluster information 125 to a user. User device 130 may be, for example, a desktop, a laptop, a mobile computing device, etc. Accordingly, the matrix included in cluster information 125 may be presented to a user via the user device 130 so that the user can identify differences between cluster results 116. In some embodiments, cluster validation system 120 identifies differences between cluster results 116 and then presents other types of information (in addition to or instead of the matrix) about any differences to the user. Cluster validation system 120 is discussed in greater detail with respect to FIG. 3.

Turning now to FIG. 2, a block diagram of example cluster platforms 110A and 110B is illustrated. In the illustrated embodiment, cluster platform 110A includes clustering algorithm implementation 114A and cluster result 116A whereas cluster platform 110B includes clustering algorithm implementation 114B and cluster result 116B. Also as illustrated, cluster result 116A includes clusters 210A and 210B while cluster result 116B includes clusters 210A, 210C, and 210D. In some embodiments, cluster platform 110A and 110B may be implemented differently than illustrated. For example, data values 112 may be maintained within cluster platforms 110 instead of being received as shown in FIG. 2.

Data values 112, in various embodiments, are data samples used for producing a cluster result 116. Within the machine learning context, data values 112 may be used to train a machine learning model (a type of cluster result 116) that classifies those data values (and future values) into one or more clusters 210. As shown in FIG. 2, data values 112 include a set of transactions 215. A transaction 215, in various embodiments, includes various pieces of information about a certain transaction. For a database transaction, a transaction 215 might identify the database command that was issued (e.g., CREATE, UPDATE, etc.), what user and/or application issued the command, etc. For a financial transaction, a transaction 215 might identify the products or services exchanged, the buyer, the seller, etc. While transactions 215 are illustrated, data values 112 may include other types of information. As an example, instead of a data value 112 being a transaction 215, a data value 112 may include information about a user (e.g., height, gender, age, etc.) that may be used to place that user in a cluster 210.

In various instances, there may be differences in the data values 112 provided to cluster platforms 110A and 110B. Such differences may result in different cluster results 116 between those cluster platforms. For example, in some cases, the data values 112 provided to one of the cluster platforms 110 may include one or more data values 112 that are not included in the data values 112 provided to the other cluster platform 110. Even one data value 112 difference may result in cluster result 116A being different than cluster result 116B, especially in hierarchical clustering. In yet some cases, the data values 112 provided to one cluster platform 110 may be in a different format than those provided to the other cluster platform 110. As an example, the data values 112 provided to cluster platform 110A may include information that is formatted as integers while the data values 112 provided to cluster platform 110B may include the same information but formatted as double-precision floating-point numbers. As such, the manner in which the data source of a cluster platform 110 stores data values 112 (e.g., as integers) may affect the cluster result 116 produced by that cluster platform.

As explained earlier and shown in FIG. 2, cluster platforms 110A and 110B each include a clustering algorithm implementation 114 for a clustering algorithm. In some cases, clustering algorithm implementations 114A and 114B may be different as a result of being implemented using different programming languages. In some cases, cluster platforms 110A and 110B may implement the clustering algorithm using the same programming language, but cluster results 116 may still differ. As an example, the clustering algorithm used may have non-deterministic properties. Accordingly, multiple runs of the clustering algorithm may create different cluster results 116.

As depicted in FIG. 2, cluster result 116A is different than cluster result 116B as cluster result 116B splits transactions T1 and T4 into two clusters 210C and 210D while cluster result 116A includes those transactions in a single cluster 210B. Accordingly, cluster results 116 may include different amounts of clusters 210. In various cases, cluster results 116 may include the same amount of clusters 210 but group data values 112 differently. In yet other cases, cluster results 116 may not be different, except for labels assigned to clusters 210. That is, a particular cluster 210 (e.g., cluster 210A) of cluster result 116A may correspond to the same cluster 210 (e.g., cluster 210A) of cluster result 116B, but they may be associated with different labels—the clustering algorithm may arbitrarily assign identifiers to clusters 210.

The various above-mentioned differences between cluster platforms 110 may result in different cluster results 116. As such, cluster results 116 may be provided to cluster validation system 120 to determine differences and/or similarities between cluster results 116. In some cases, a single cluster platform 110 may generate different cluster results 116. For example, if a cluster platform implements a non-deterministic clustering algorithm, then multiple iterations of that algorithm may result in different cluster results 116. Such cluster results 116 may also be provide to cluster validation system 120.

Figure 3:
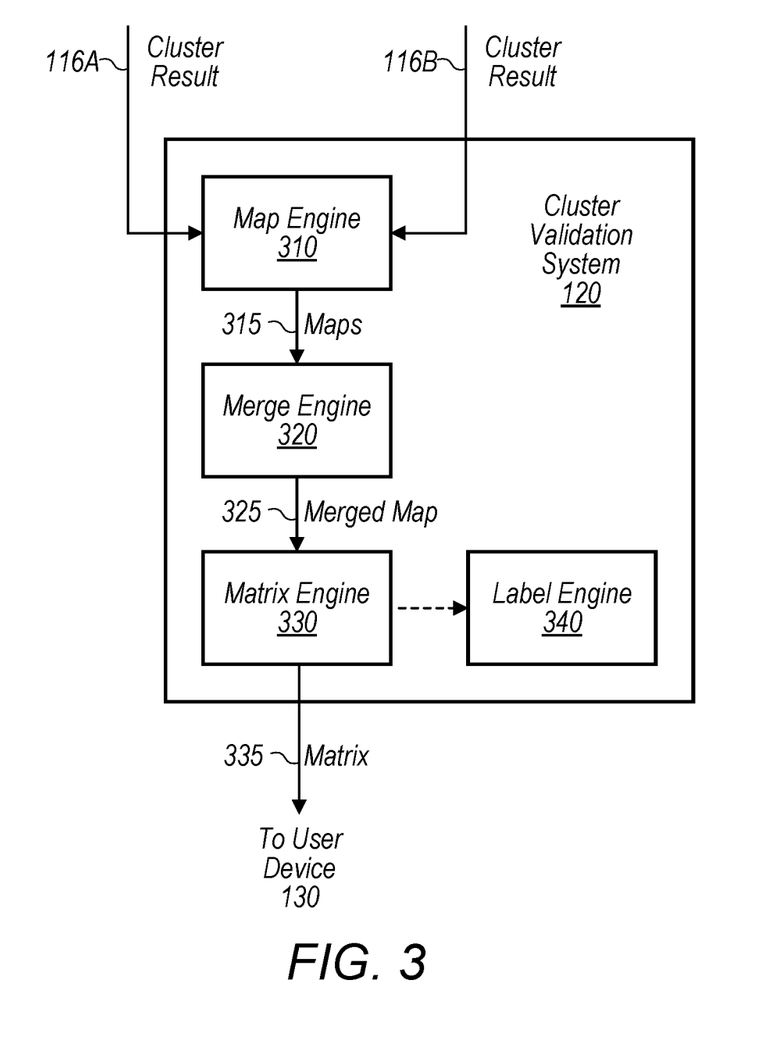
FIG. 3 is a block diagram illustrating example elements of a cluster validation system capable of determining differences between cluster results, according to some embodiments.

Turning now to FIG. 3, a block diagram of an example cluster validation system 120 is illustrated. In the illustrated embodiment, cluster validation system 120 includes a map engine 310, a merge engine 320, a matrix engine 330, and a label engine 340. In some embodiments, cluster validation system 120 may be implemented differently than illustrated. For example, cluster validation system 120 may not include label engine 340.

Map engine 310, in various embodiments, creates a map 315 based on a received cluster result 116. Consequently, map engine 310 may create two maps 315 in response to receiving cluster results 116A and 116B. To create a map 315, in various embodiments, map engine 310 maps each data value 112 (used to produce the respective cluster result 116) to a cluster 210 in that cluster result 116. In some cases, an identifier for a data value 112 may be mapped to an identifier for a cluster 210. For example, a transaction identifier for a transaction 215 may be mapped to an identifier of the cluster 210 in which it falls. After creating maps 315 for cluster results 116A and 116B, map engine 310 may provide those maps 315 to merge engine 320.

Merge engine 320, in various embodiments, merges received maps 315 into a merged map 325 that correlates a given data value 112 with a cluster from each cluster result 116 (when applicable as that data value 112 may appear in only a subset of maps 315). To generate merged map 325, merge engine 320 may identify a data value 112 from one of the received maps 315 and then may determine what clusters 210 that data value 112 corresponds to in the other maps 315. Merge engine 320 may then map that data value 112 within merged map 325 to all of the determined clusters 210. Consider cluster result 116A and 116B of FIG. 2. Merge engine 320 may receive a map 315 that maps transaction T1 to cluster 210B of cluster result 116A and a second map 315 that maps transaction T1 to cluster 210C of cluster result 116B. Merge engine 320 may merge those maps 315 to create a merged map 325 that maps transaction T1 to both cluster 210B of cluster result 116A and 210C of cluster result 116B.

In some cases, a data value 112 may not appear in all of the received maps 315. As an example, a first cluster result 116 may include a transaction T6 not included in a second cluster result 116. As such, the map 315 associated with the second cluster result 116 may not include a mapping between transaction T6 and a cluster 210. Accordingly, merged map 325 may map transaction T6 to a placeholder value (e.g., a null value) for the second cluster result. Thus, in some cases, when merging two maps 315 that correspond to cluster results 116A and 116B, a data value 112 within merged map 325 may map to a cluster 210 and a placeholder value. After creating merged map 325, merge engine 320 may provide merged map 325 to matrix engine 330. In some embodiments, map engine 310 and merge engine 320 may be a part of the same mapping engine.

Matrix engine 330, in various embodiments, creates a matrix 335 based on merged map 325. As expressed previously, matrix 335 may include a set of rows and columns where a given row corresponds to a certain cluster 210 in cluster result 116A and a given column corresponds to a certain cluster 210 in cluster result 116B (or vice versa). The intersection of a row and a column may correspond to a value that indicates a number of data values 112 common between the two clusters 210 corresponding to the row and the column. The value may be derived based on merged map 325, which may indicate data values 112 that correspond to a given two clusters 210.

After generating matrix 335, matrix engine 330 may send matrix 335 to a user device 130 for presenting to a user so that the user may see the differences and the similarities between cluster results 116A and 116B. In various embodiments, system 120 automatically determines the differences and the similarities between cluster results 116. Accordingly, instead of sending matrix 335 to user device 130, system 120 may send information that specifies the differences and the similarities. Consider cluster results 116A and 116B of FIG. 2. System 120 may send information to user device 130 that states that cluster 210B of cluster result 116A groups data values 112 grouped by clusters 210C and 210D of cluster results 116B. In some embodiments, instead of communicating with a user device 130, cluster validation system 120 may present information on a display of system 120.

Upon identifying a difference between cluster results 116, in various cases, a user may wish to know more about the relevant clusters 210. Accordingly, a request may be sent to label engine 340 to label clusters 210 with human-readable labels that indicate a set of properties of those clusters. Label engine 340, in various embodiments, labels clusters 210 based on the data values 112 included in those clusters. Consider an example in which a particular cluster 210 groups data values 112 that identify complaints against merchants. Accordingly, that particular cluster 210 may be labeled as "untrustworthy merchants" or an equivalent. The labels may be presented to the requesting user so that the user may further determine the relationship between a set of clusters 210.

Figure 4:
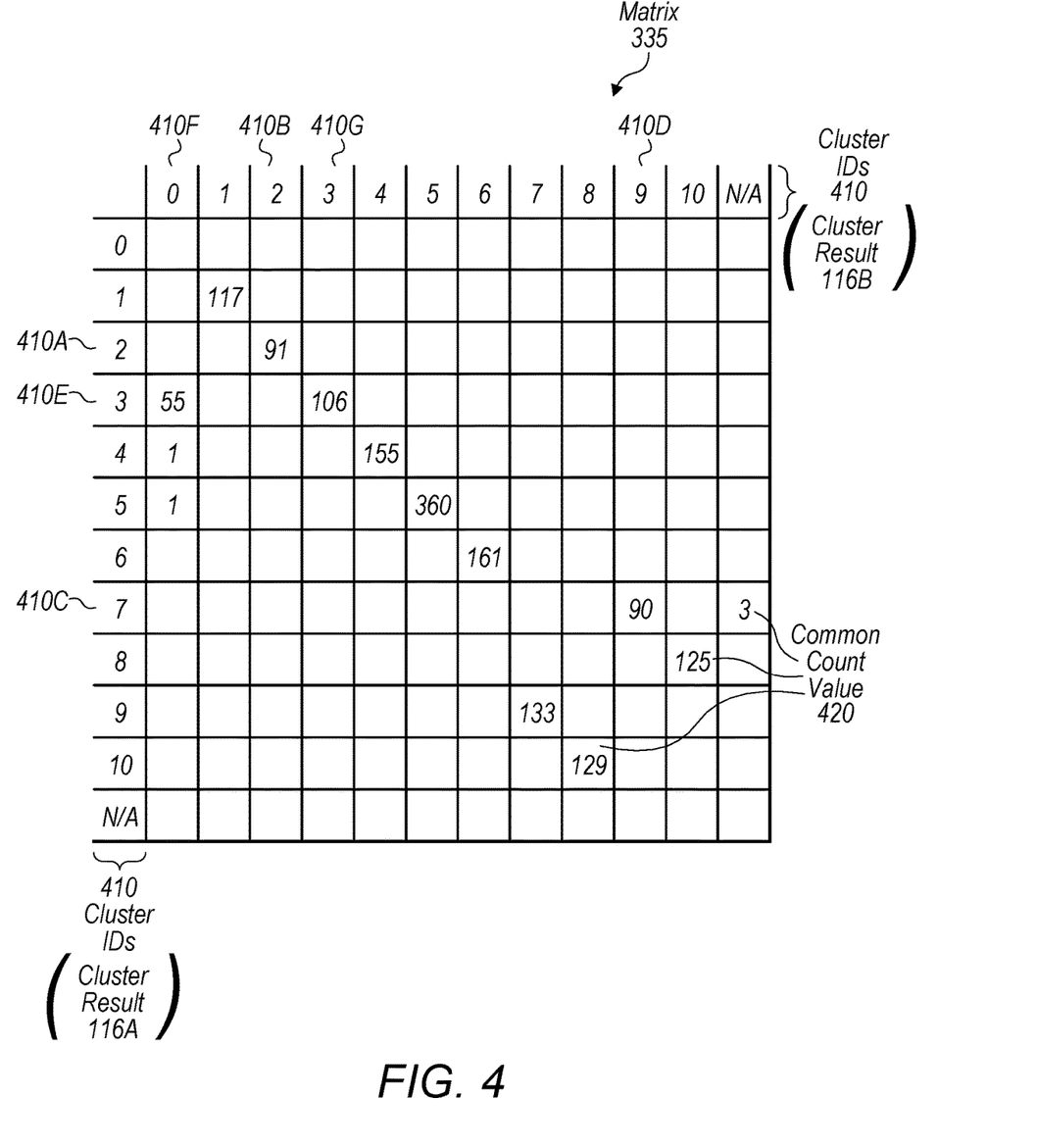
FIG. 4 is a block diagram illustrating example elements of a matrix usable to identify differences between cluster results, according to some embodiments.

Turning now to FIG. 4, a block diagram of an example matrix 335 is illustrated. In the illustrated embodiment, matrix 335 includes a set of rows corresponding to cluster result 116A and a set of columns corresponding to cluster result 116B. As further illustrated, the rows and the columns represent cluster identifiers 410 taken from their respective cluster results 116. In some embodiments, matrix 335 may be implemented differently than shown. As an example, matrix 335 may not include a row and/or a column that represents a cluster identifier of "N/A."

As shown in FIG. 4, various intersections of matrix 335 include a common count value 420. A common count value 420, in various embodiments, indicates a number of data values 112 that are common between two particular cluster identifiers 410—that is, data values 112 that are common between to clusters 210 corresponding to those identifiers 410. For example, cluster identifier 410A and cluster identifier 410B share 91 common data values 112. That is, the particular cluster 210 corresponding to identifier 410A groups the same 91 data values 112 as the particular cluster 210 corresponding to identifier 410B. As another illustrated example, cluster identifiers 410C and 410D correspond to clusters 210 that group the same 90 data values 112.

In some cases, a particular cluster 210 of one cluster result 116 may group data values 112 that are grouped by two or more clusters 210 of another cluster result 116. As illustrated for example, the particular cluster 210 corresponding to cluster identifier 410E groups 55 data values 112 with the cluster 210 corresponding to identifier 410F and 106 data values 112 with the cluster 210 corresponding to identifier 410G. A user may be able to discern that a particular cluster 210 is split into multiple clusters 210 in another cluster result 116 when the row or the column corresponding to that particular cluster 210 includes more than one common count value 420 in matrix 335. Thus, a user may determine that two cluster results 116 are different by viewing matrix 335.

Figure 5:
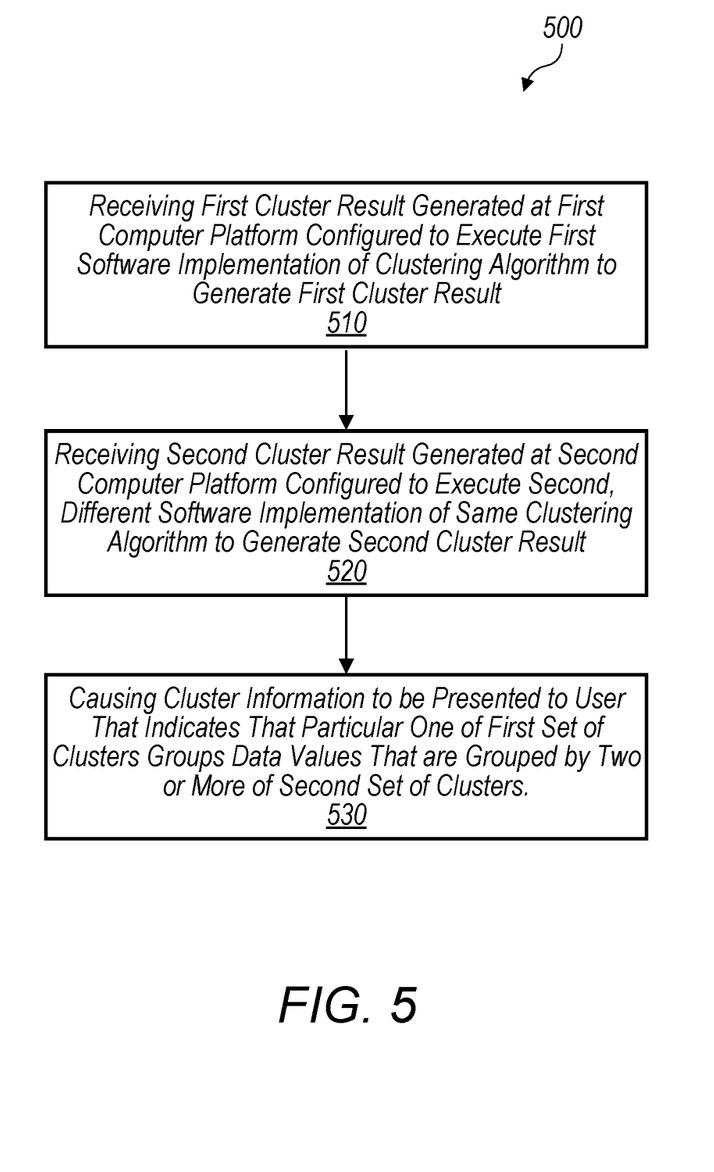
FIGS. 5-6 are flow diagrams illustrating example methods that pertain to facilitating the validation of cluster results, according to some embodiments.

Turning now to FIG. 5, a flow diagram of a method 500 is shown. Method 500 is one embodiment of a method performed by a computer system (e.g., cluster validation system 120) to facilitate the identification of differences between cluster results (e.g., cluster results 116A and 116B). Method 500 may be performed by executing a set of program instructions stored on a non-transitory computer-readable medium. Method 500 may include additional steps that are not illustrated. As an example, the computer system may label clusters included in a cluster result.

Method 500 begins in step 510 with the computer system receiving a first cluster result (e.g., cluster result 116A) generated at a first computer platform (e.g., cluster platform 110A) configured to execute a first software implementation (e.g., clustering algorithm implementation 114A) of a clustering algorithm to generate the first cluster result. The first cluster result may include a first set of clusters (e.g., clusters 210A and 210B), each of which groups one or more of a first plurality of data values.

In step 520, the computer system receives a second cluster result (e.g., cluster result 116B) generated at a second computer platform (e.g., cluster platform 110B) configured to execute a second, different software implementation (e.g., clustering algorithm implementation 114B) of the same clustering algorithm to generate the second cluster result. The first software implementation may be implemented using a different computer programming language than the second software implementation. The second cluster result may include a second set of clusters (e.g., clusters 210A, 210C, and 210D), each of which groups one or more of a second plurality of data values. The first plurality of data values may include one or more data values not included in the second plurality of data values. In some embodiments, the first plurality of data values are stored in a different format than the second plurality of data values—e.g., the first plurality of data values may be stored as integer values whereas the second plurality of data values may be stored as double-precision floating-point values. In some cases, the first set of clusters may include a different amount of clusters than the second set of clusters.

In step 530, the computer system causes cluster information (e.g., cluster information 125) to be presented to a user (e.g., via user device 130). The cluster information may indicate that a particular one (e.g., cluster 210B) of the first set of clusters groups data values that are grouped by two or more (e.g., clusters 210C and 210D) of the second set of clusters. In some cases, a particular one of the first set of clusters corresponds to a particular one of the second set of clusters, but is associated with a different label.

In some embodiments, the computer system creates the cluster information based on a cluster mapping (e.g., merged map 325) in which a given data value (e.g., data value 112) that is common between the first and second pluralities of data values is mapped to one of the first set of clusters and to one of the second set of clusters. In order create the cluster mapping, the computer system may create, for the first cluster result, a first mapping (e.g., a map 315) that maps each of the first plurality of data values to a respective one of the first set of clusters. The computer system may further create, for the second cluster result, a second mapping that maps each of the second plurality of data values to a respective one of the second set of clusters. The computer system may then merge the first mapping and the second mapping to create the cluster mapping.

The computer system, creates, based on the cluster mapping, a matrix (e.g., matrix 335) that comprises a plurality of columns and rows corresponding to the first and second sets of clusters. An intersection of a row and a column may include a value (e.g., common count 420) indicating a number of data values that are common between a first cluster in the first set of clusters that corresponds to the row and a second cluster in the second set of clusters that corresponds to the column (or vice versa).

Subsequent to causing the cluster information to be presented to the user, the computer system may receive a request to perform a subsequent action on the particular cluster and the two or more clusters. The computer system may perform the subsequent action by at least labeling each of the particular cluster and the two or more clusters with a human readable label that indicates a property of that respective cluster.

Figure 6:
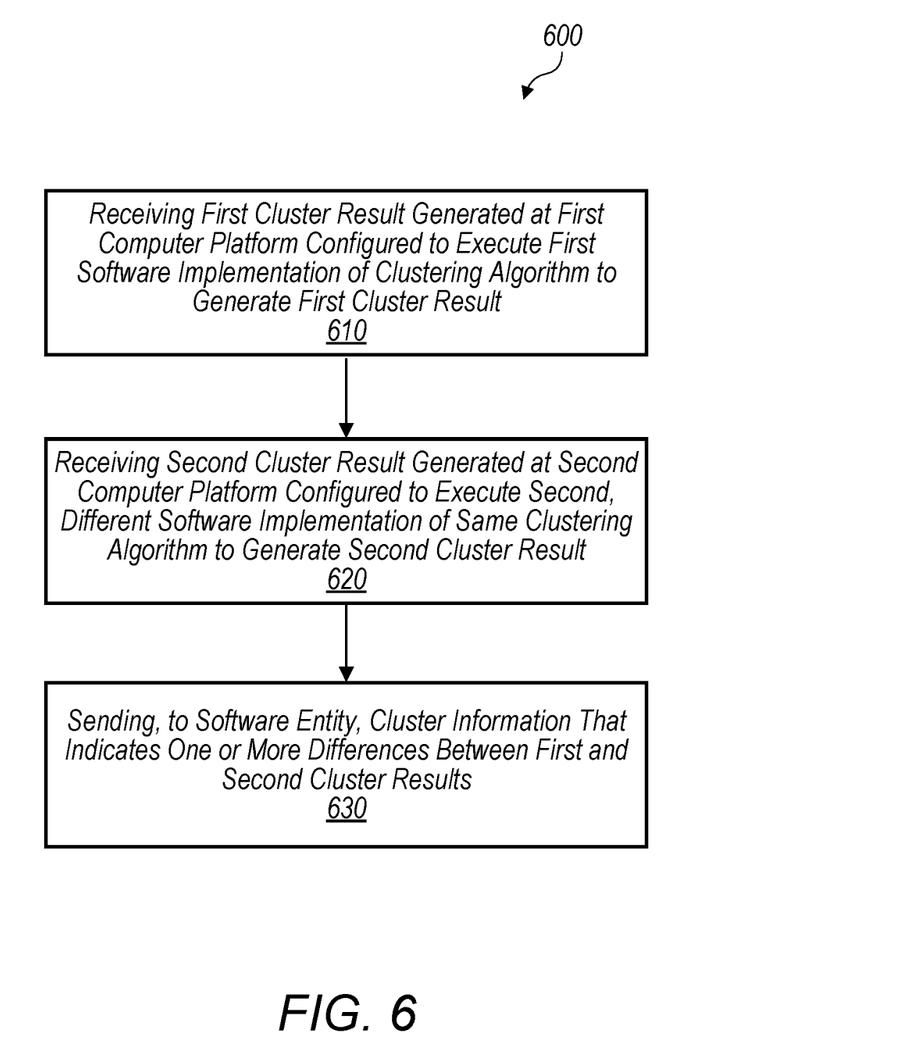

Turning now to FIG. 6, a flow diagram of a method 600 is shown. Method 600 is one embodiment of a method performed by a computer system (e.g., cluster validation system 120) to facilitate the identification of differences between cluster results (e.g., cluster results 116A and 116B). Method 500 may be performed by executing a set of program instructions stored on a non-transitory computer-readable medium. Method 500 may include additional steps that are not illustrated. As an example, the computer system may generate a cluster mapping (e.g., merged map 325) that be used to identify differences between cluster results.

Method 600 begins in step 610 with the computer system receiving a first cluster result (e.g., cluster result 116A) generated at a first computer platform (e.g., cluster platform 110A) configured to execute a first software implementation (e.g., clustering algorithm implementation 114A) of a clustering algorithm to generate the first cluster result. The first cluster result may include a first set of clusters (e.g., clusters 210A and 210B), each of which groups one or more of a first plurality of data values.

In step 620, the computer system receives a second cluster result (e.g., cluster result 116B) generated at a second computer platform (e.g., cluster platform 110B) configured to execute a second, different software implementation (e.g., clustering algorithm implementation 114B) of the same clustering algorithm to generate the second cluster result. The second cluster result may include a second set of clusters, each of which groups one or more of a second plurality of data values. In some embodiments, the clustering algorithm may be a non-deterministic-based clustering algorithm.

In step 630, the computer system sends cluster information (e.g., cluster information 125) to a software entity capable of processing the cluster information. The cluster information indicates one or more differences between the first and second cluster results. The one or more differences may include the first cluster result having a different number of clusters then the second cluster result. The one or more differences may include a particular one of the first set of clusters grouping data values that are grouped by two or more of the second set of clusters. The software entity may be a computer application that can determine, based on the cluster information, an amount of similarity between the first and second cluster results. If the amount of similarity does not satisfy a threshold condition, the software entity may instruct one or both of the first and second computer platforms to create new cluster results.

Exemplary Computer System

Figure 7:
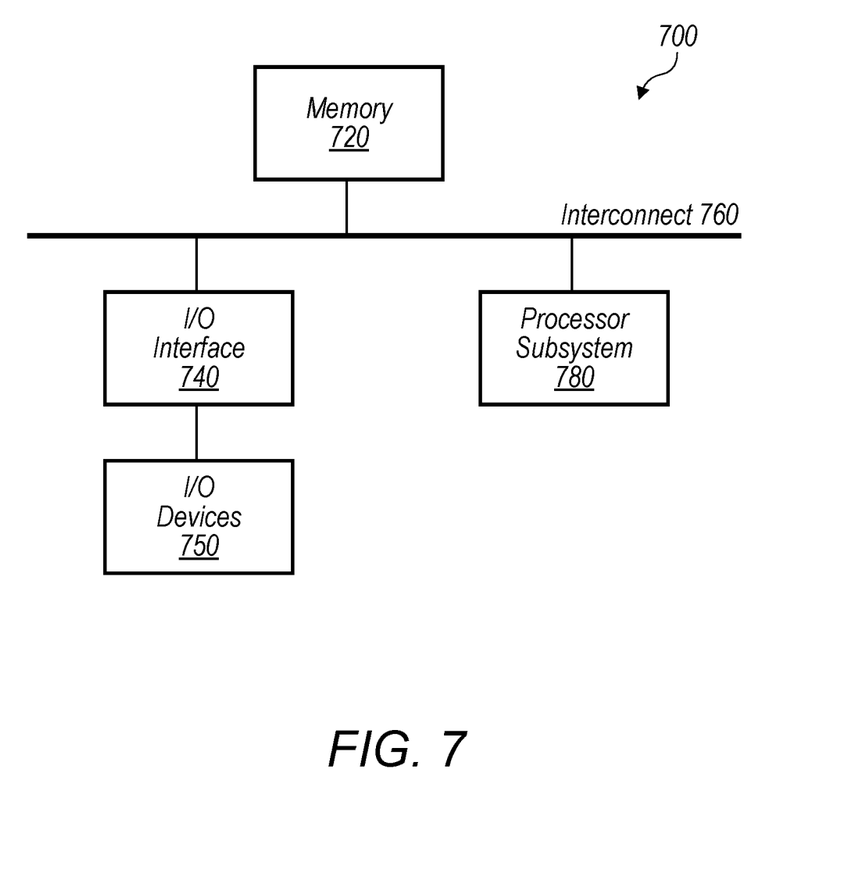
FIG. 7 is a block diagram illustrating an example computer system, according to some embodiments.

Turning now to FIG. 7, a block diagram of an exemplary computer system 700, which may implement cluster platform 110A, cluster platform 110B, cluster validation system 120, and/or user device 130, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement clustering algorithm implementations 114A and 114B, map engine 310, merge engine 320, and matrix engine 330 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a computer system, a first result generated at a first computer platform configured to execute a first software implementation of a clustering algorithm to generate the first result, wherein the first result groups a first plurality of data values into a first set of clusters;
receiving, by the computer system, a second result generated at a second computer platform configured to execute a second, different software implementation of the clustering algorithm to generate the second result, wherein the second result groups a second plurality of data values into a second set of clusters; and
causing, by the computer system, cluster information to be presented to a user that identifies a set of numerical values, a given one of which identifies a number of data values that are common between a given cluster of the first set of clusters and a given cluster of the second set of clusters, wherein the set of numerical values is indicative of one or more differences between the first and second sets of clusters resulting from differences between the first and second software implementations of the clustering algorithm, and wherein the one or more differences include that a particular one of the first set of clusters groups data values that are grouped by two or more of the second set of clusters.

2. The method of claim 1, further comprising:
creating, by the computer system, a cluster mapping in which a given data value that is common between the first and second pluralities of data values is mapped to one of the first set of clusters and to one of the second set of clusters; and
creating, by the computer system, the cluster information based on the cluster mapping.

3. The method of claim 2, wherein creating the cluster information includes:
creating, by the computer system based on the cluster mapping, a matrix that comprises a plurality of columns and rows corresponding to the first and second sets of clusters, wherein an intersection of a row and a column includes one of the set of numerical values, wherein the first and second clusters correspond to the row and the column.

4. The method of claim 2, wherein the given data value specifies a transaction identifier for a corresponding transaction, wherein a given cluster in the first or second sets of clusters is associated with a cluster identifier, and wherein creating the cluster mapping includes:
mapping, by the computer system, the transaction identifier to a cluster identifier of the cluster in the first set of clusters and to a cluster identifier of the cluster in the second set of clusters.

5. The method of claim 1, wherein the first software implementation is implemented using a different computer programming language than the second software implementation.

6. The method of claim 1, wherein the first plurality of data values includes one or more data values not included in the second plurality of data values.

7. The method of claim 1, wherein the first plurality of data values are stored in a different format than the second plurality of data values.

8. The method of claim 1, wherein the first set of clusters includes a different number of clusters than the second set of clusters.

9. The method of claim 1, wherein a particular one of the first set of clusters corresponds to a particular one of the second set of clusters, but is associated with a different label.

10. The method of claim 1, further comprising:
subsequent to causing the cluster information to be presented to the user, the computer system receiving a request to perform a subsequent action on the particular cluster and the two or more clusters; and
performing, by the computer system, the subsequent action by at least labeling each of the particular cluster and the two or more clusters with a human readable label that indicates a property of that respective cluster.

11. A non-transitory computer readable medium having program instructions stored thereon that are executable by a computer system to cause the computer system to perform operations comprising:
receiving a first result generated at a first computer platform, wherein the first result groups a first plurality of data values into a first set of clusters;
receiving a second result generated at a second computer platform, wherein the second result groups a second plurality of data values into a second set of clusters; and
causing cluster information to be presented to a user that identifies a set of numerical values, a given one of which identifies a number of data values that are common between a given cluster of the first set of clusters and a given cluster of the second set of clusters, wherein the set of numerical values is indicative of one or more differences between the first and second sets of clusters resulting from differences between different, respective software implementations of a clustering algorithm at the first and second computer platforms, and wherein the one or more differences include that a particular one of the first set of clusters groups data values that are grouped by two or more of the second set of clusters.

12. The medium of claim 11, wherein the operations further comprise:
creating a cluster mapping that maps a data value common between the first and second pluralities of data values to one of the first set of clusters and to one of the second set of clusters.

13. The medium of claim 12, wherein creating the cluster mapping includes:
creating, for the first result, a first mapping that maps each of the first plurality of data values to a respective one of the first set of clusters;
creating, for the second result, a second mapping that maps each of the second plurality of data values to a respective one of the second set of clusters; and
merging the first mapping and the second mapping to create the cluster mapping.

14. The medium of claim 11, wherein the one or more differences further result from the first computer platform processing the first plurality of data values in a first format and the second computer platform processing the second plurality of data values in a second, different format.

15. A system, comprising:
at least one processor; and
memory having program instructions stored thereon that are executable by the at least one processor to cause the system to perform operations comprising:
receiving a first result generated at a first computer platform configured to execute a first software implementation of a clustering algorithm to generate the first result, wherein the first result groups a first plurality of data values into a first set of clusters;
receiving a second result generated at a second computer platform configured to execute a second, different software implementation of the clustering algorithm to generate the second result, wherein the second result groups a second plurality of data values into a second set of clusters; and
sending cluster information to a software entity capable of processing the cluster information, wherein the cluster information identifies a set of numerical values, a given one of which identifies a number of data values that are common between a given cluster of the first set of clusters and a given cluster of the second set of clusters, and wherein the set of numerical values is indicative of one or more differences between the first and second sets of clusters resulting from differences between the first and second software implementations of the clustering algorithm.

16. The system of claim 15, wherein the one or more differences include the first result having a different number of clusters then the second result.

17. The system of claim 15, wherein the one or more differences include a particular one of the first set of clusters grouping data values that are grouped by two or more of the second set of clusters.

18. The system of claim 15, wherein at least one of the first set of clusters includes a data value not included in any of the second set of clusters.

19. The system of claim 15, wherein the clustering algorithm is a non-deterministic-based clustering algorithm.

* * * * *